United States Patent [19]

Pirovano

[11] 4,207,838

[45] Jun. 17, 1980

[54] FEEDING TROUGH, FOR ANIMAL RAISING INSTALLATION, PARTICULARLY FOR FOWL FEEDING

[76] Inventor: Camillo Pirovano, Via Spluga 52, Cernusco Lombarcone (Como), Italy

[21] Appl. No.: 933,600

[22] Filed: Aug. 14, 1978

[30] Foreign Application Priority Data

Aug. 31, 1977 [IT] Italy .............................. 22089 B/77

[51] Int. Cl.² ................................................ A01K 5/00
[52] U.S. Cl. .............................. 119/51 CF; 198/837
[58] Field of Search ............ 119/51 CF, 52 AF, 52 B; 198/729, 837, 735, 733, 716

[56] References Cited

U.S. PATENT DOCUMENTS

| | | | |
|---|---|---|---|
| 2,554,589 | 5/1951 | Patz et al. ........................ | 119/51 CF |
| 2,757,783 | 8/1956 | Zacur .................................... | 198/729 |
| 2,934,199 | 4/1960 | Winkler ........................... | 119/52 AF |
| 3,918,405 | 11/1975 | Hostetler ........................ | 119/52 AF |
| 3,962,996 | 6/1976 | Jones et al. ...................... | 119/51 CF |

FOREIGN PATENT DOCUMENTS 899738 5/1972 Canada ............................... 119/52 AF

*Primary Examiner*—Jay N. Eskovitz
*Attorney, Agent, or Firm*—Stevens, Davis, Miller & Mosher

[57] ABSTRACT

In a fowl-feeding machine of the cable and spaced disk type, the improvement consisting in that pressing and positioning spacers urge from the top the disks as they travel on the trough bottom wall so as to maintain such disks in position. By so doing, no fodder build up can be experienced locally and it is possible to prevent fodder spillage.

1 Claim, 2 Drawing Figures

U.S. Patent Jun. 17, 1980 4,207,838
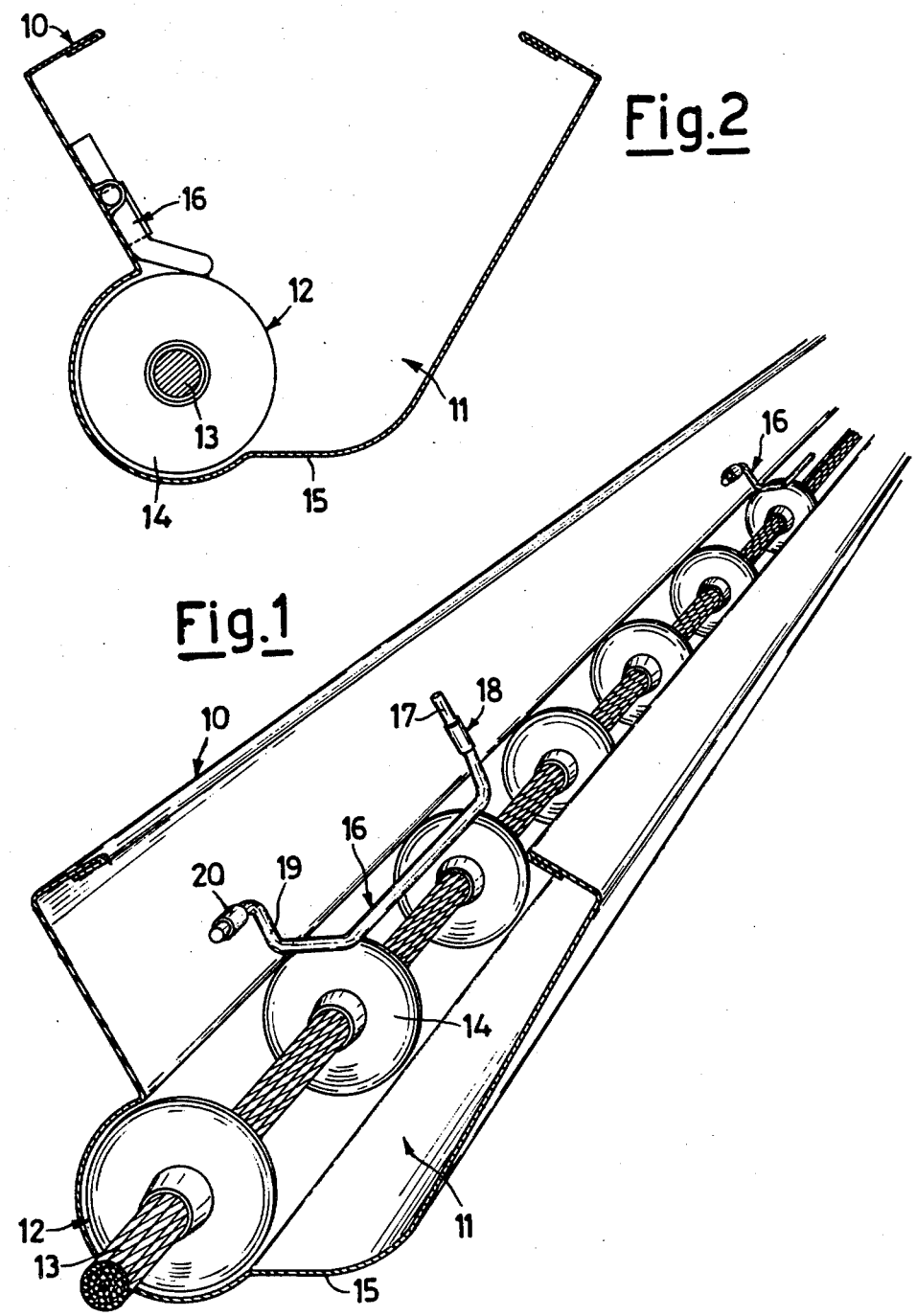

FEEDING TROUGH, FOR ANIMAL RAISING INSTALLATION, PARTICULARLY FOR FOWL FEEDING

This invention relates to a feeding trough adapted for the automatic dispensing of fodder in animal raising installations, and especially for feeding domestic fowl.

Up to date fowl raising plants and especially those for chickens, are equipped with automatic fodder distribution systems, a few of which comprise troughs having a substantially tubular outline, the cross-sectional profile of which is substantially polygonal and open at the top and laterally of which a specially provided seat is present for housing a conveyor device for distributing such fodder in the individual troughs.

A conventional fodder conveyance and distribution system is composed, for example, by a cable sliding in the seat aforesaid and has fastened coaxially therewith a plurality of properly spaced-apart disks which are evenly spaced from one another.

Said disks, during progress of their sliding motion, dip in one or more fodder-feeding hoppers and take out the fodder to distribute same among the several troughs through specially provided openings which establish a communication between the seat of sliding and the troughs, or also through a single continuous side opening which is formed along the entire length of the troughs.

It is known that chickens select the best fodder from among the mass distributed by the dispensing device aforementioned, that which originates deposits in the troughs of the fodder which is not used up by the fowl.

It is obvious that the deposits which are formed prevailingly in the initial sections of the troughs, in the vicinity of the feed ends are continuously increased during progress of further fodder dispensing cycles so that the fodder itself is prevented from being fed forward and the considerable drawback is experienced that the chickens which are in a position remoted from the feed ends are insufficiently fed. In addition, in correspondence with such deposits, the fodder overbrims the open top section of the trough and spillage of fodder is experienced and soils the fowl raising environment, a fact which is far from being desirable for self-explanatory hygienic reasons.

To find a redress has already been suggested to establish a communication between the seat of the fodder conveyance and distribution system with the trough proper by means of an opening which is continuous and stands at the top and is spaced apart from the side openings which are formed through the walls of such a seat. By so doing, it has become possible to achieve a more uniform distribution of the fodder also in those portions of the troughs which are farther from the feeding sides so that all the chickens of a raising lot are fed in a more uniform and reasonable way.

However, it has been ascertained that also this approach is not fully satisfactory, especially since in the trough proper fodder discarded by the fowl is accumulated and is not recycled, whereas the fresh fodder is, for a predominant fraction, carried away by the conveyance device.

An object of this invention is further to improve such a kind of trough and, with a view to achieving this objective, a trough has been embodied which has a substantially tubular outline, with a polygonal cross-sectional contour open at the top and comprising a seat for a fodder conveyance and distribution system, as well as a space which is the trough proper, said trough being characterized in that seat of the fodder conveyance and distribution system and the trough space are mutually in free communication along the entire trough length, means being provided for retaining in its seat the conveyance and distribution system, said means acting from above on the device and being arranged at a certain distance apart from one another.

In order that the features of the invention under discussion may be better understood, and by way of example only, a description will be given with reference to the accompanying drawings, wherein:

FIG. 1 is a perspective view of a trough embodied according to this invention.

FIG. 2 is a front elevational view of the trough of FIG. 1.

The reference numeral 10 generally indicates an embodiment of a trough according to the invention, which can be made of metal or a plastics material, having substantially a tubular outline, having a polygonal contour open at its top. The trough is substantially divided into two portions: a space 11 which is the trough proper and a seating 12 having a circular cross-section and within which a cable 13 slide which carries, coaxially, a plurality of discs 14 which are appropriately and evenly spaced apart from each other.

The seating 12 and the space 11 are in free communication with one another along the entire trough length.

The discs 14 during progress of their sliding motion dip is one or more feeding hoppers (not shown) and draw the fodder, introduce it in the trough head-on and dipense it in the space 11 which has a substantially planar bottom wall 15 laterally of the seat 12 on which the discs 14 slide.

As clearly viewed in the drawings, the seating 12 has no partition sidewall relative to the space 11.

In order to prevent the cable 13 and the disks 14 from exiting the seat 12, curled spacers 16 are provided and resiliently act from above on the disks 14. These spacers 16 have substantially a U-outline and can be formed with an iron wire or rod. A stalk 17 of each spacer is straight and is slipped into a bushing 18, the latter being solidly affixed to the trough wall, whereas the other stalk 19 is bent and is slipped with its end perpendicular to the first stalk 17 into a second bushing 20.

The advantages of such an embodiment can be briefly summarized by the evenness of distribution of the fodder along all of the sections of the trough, no deposit of fodder whatsoever being formed, as discarded by the fowl, by the improved cleanliness and hygiene of the fowl raising installation since the fodder does not overbrim the open top side of the troughs, all accompanied by a not negligible economical asset since no fodder spoilage is to be suffered from.

The fodder lying on the bottom wall 15, of the space 11 and which has possibly been discarded by the fowl, is directed by the bill motion of the eating fowl under the radius of action of the conveyor again so that the conveyor recycles such fodder and dispenses it to the fowl once more.

I claim:

1. A trough for feeding animals, especially in fowl-raising premises, having a substantially tubular form and a polygonal cross-section open at the top comprising a seat for a fodder conveying and dispensing system as well as a space which is the feeding trough proper, characterized in that the seat of the fodder conveying and dispensing system and the trough space are in mutual free communication along the entire trough length, said trough space being laterally displaced from said seat and defining a horizontal bottom wall, means being further provided for holding said conveyance and dispensing device in its seat, said means being active from above into the system and being arranged spaced apart by a certain distance from each other, said spacers being made of iron wire or rod having a substantially U-shaped outline with the stems inserted in bushings which are perpendicular to one another and fastened to a trough wall.

* * * * *